United States Patent
St. Jacques et al.

(10) Patent No.: US 9,047,508 B2
(45) Date of Patent: Jun. 2, 2015

(54) SYSTEM AND METHOD FOR IDENTIFYING AND ACTING UPON HANDWRITTEN ACTION ITEMS

(71) Applicant: Xerox Corporation, Norwalk, CT (US)

(72) Inventors: Robert J. St. Jacques, Fairport, NY (US); Mary Catherine McCorkindale, Fairport, NY (US); Saurabh Prabhat, Webster, NY (US); Michael Robert Furst, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 216 days.

(21) Appl. No.: 13/671,220

(22) Filed: Nov. 7, 2012

(65) Prior Publication Data
US 2014/0126823 A1   May 8, 2014

(51) Int. Cl.
*G06K 9/72* (2006.01)
*G06K 9/00* (2006.01)
*G06K 9/20* (2006.01)
*G06F 3/0488* (2013.01)

(52) U.S. Cl.
CPC ........ *G06K 9/00442* (2013.01); *G06K 9/00422* (2013.01); *G06K 9/2054* (2013.01); *G06F 3/04883* (2013.01); *G06K 9/2063* (2013.01); *G06K 9/00429* (2013.01)

(58) Field of Classification Search
USPC ......... 382/100, 155, 159, 176, 177, 179, 181, 382/187–190, 195, 209, 224, 229, 306, 325
See application file for complete search history.

(56) References Cited

U.S. PATENT DOCUMENTS

| | | | |
|---|---|---|---|
| 5,530,861 A | 6/1996 | Diamant et al. | |
| 6,438,545 B1* | 8/2002 | Beauregard et al. | 1/1 |
| 7,295,193 B2* | 11/2007 | Fahraeus | 382/189 |
| 7,571,108 B1* | 8/2009 | Leban | 705/7.26 |
| 7,650,568 B2* | 1/2010 | Williamson et al. | 715/268 |
| 7,936,925 B2 | 5/2011 | Martin et al. | |
| 2004/0054701 A1* | 3/2004 | Garst | 708/131 |
| 2004/0240739 A1* | 12/2004 | Chang et al. | 382/186 |
| 2006/0209053 A1* | 9/2006 | Cohen et al. | 345/179 |
| 2007/0082710 A1* | 4/2007 | Jang | 455/566 |
| 2007/0143663 A1* | 6/2007 | Hansen et al. | 715/512 |
| 2010/0066691 A1* | 3/2010 | Li | 345/173 |
| 2010/0088144 A1* | 4/2010 | Collet et al. | 705/9 |
| 2012/0053955 A1 | 3/2012 | Martin et al. | |

OTHER PUBLICATIONS

Purver et al., "Detecting Action Items in Multi-Party Meetings: Annotation and Initial Experiments", Center for the Study of Language and Information, Stanford University, Stanford, CA 94305, published 2006.

* cited by examiner

Primary Examiner — Eric Rush
(74) Attorney, Agent, or Firm — Fox Rothschild LLP (57) ABSTRACT

A method and system for identifying and acting on a handwritten action item is disclosed. The system may learn a set of user-defined symbols and associate each symbol with an action category. Then, when the system that captures a handwritten action item that includes one of the symbols, it will determine which action category that corresponds to the symbol, identify process parameters in the action item, determine a task to be performed based on the action category, and apply the process parameters to automatically perform the task.

19 Claims, 4 Drawing Sheets

SYSTEM AND METHOD FOR IDENTIFYING AND ACTING UPON HANDWRITTEN ACTION ITEMS

BACKGROUND

It is common for people to record handwritten notes when attending a meeting, participating in a telephone conference, speaking with another person, and in other situations. In order to help individuals electronically archive the notes, intelligent character recognition (ICR) software is available to convert the text into an electronic file. If the user enters the text into a tablet computer or another device having a touch-screen, ICR software may convert the text to electronic data in real time.

In some cases, handwritten notes may contain more than just text that is to be archived. For example, the text may include one or more action items for the person to follow up on. Such action items may include, for example, a date, time and/or location for a future event; a due date for preparation of a proposal or presentation; a requirement to draft meeting minutes or a follow-up email; or other action items. Currently, the person must manually process these items in order to catalog them for future reference. For example, the user may enter future meetings or deadlines into an electronic calendar, a to-do list file, or a scheduling application. This process can be time-consuming, as it essentially requires the user to document each action item twice.

This document describes a method and system that can help solve at least some of the problems described above.

SUMMARY

In an embodiment, a system for processing action items includes a database that stores user-defined symbols and a corresponding action category for each of the user-defined symbols, along with a capture module comprising programming instructions that, when executed, cause an electronic device to capture handwritten information. It also includes an information processing module comprising programming instructions that cause a processor to perform a method. The database and both of the modules may be part of an electronic device, or they may be physically separate from but electronically accessible to the device, as with a remote networked database or a cloud-based software application that may be used via an electronic device's browser.

The system also may include an information processing module comprising programming instructions that, when executed, cause the processor to execute a method. When the method is executed, the system may process the captured information to identify a handwritten action item in the captured information, identify a first portion of the handwritten action item that includes one of the user-defined symbols; assign a category to the handwritten action item based on action category that corresponds to the user-defined symbol that is in the identified portion; identify a process parameter in a second portion of the handwritten action item; determine a task to be performed based on the first portion, the second portion, or both; and perform the task using the process parameter.

Optionally, the system also may include a training module comprising programming instructions that, when executed, cause a processor to learn one or more user-defined symbols; identify an action category that corresponds to each of the learned user-defined symbols; and store each learned user-defined symbol in association with its corresponding action category in the database. When learning the one or more user-defined symbols, the system may present a user with a prompt to correlate a symbol to an action category; and receive a user response to the prompt. Alternatively, when learning the one or more user-defined symbols, the system may present the user with an action item that corresponds to a known category; receive a user-defined symbol in response to the presenting; and assign the known category to the received user-defined symbol.

Optionally, when learning the one or more user-defined symbols, the system may analyze a handwritten document that includes multiple action items. Each action item which corresponds to a known unique action category, and the document also may include at least one handwritten symbol for each of the action items. For at least one of the handwritten symbols in the document, the system may identify the known unique action category which corresponds that handwritten symbol's action item, and it may assign the identified known unique action category to that handwritten symbol.

In some embodiments, the process parameter may include a message recipient. If so, the task may include sending an electronic message, and performing the task may include causing a messaging application to identify contact information for the message recipient, and create and send an electronic message to the message recipient.

In some embodiments, the process parameter may include a date. If so, the task may include updating an electronic calendar application, and performing the task may include causing a calendar application to create and save an appointment on the date. In some embodiments, the process parameter may include a date, a time and an invitee. If so, the task may include updating an electronic calendar application, and performing the task may include causing the calendar application to create and save an appointment on the date at the time, causing the calendar application to generate an appointment request for the invitee, accessing a messaging application to retrieve contact information for the invitee, and causing the messaging application to use the contact information to transmit the appointment request to the invitee.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
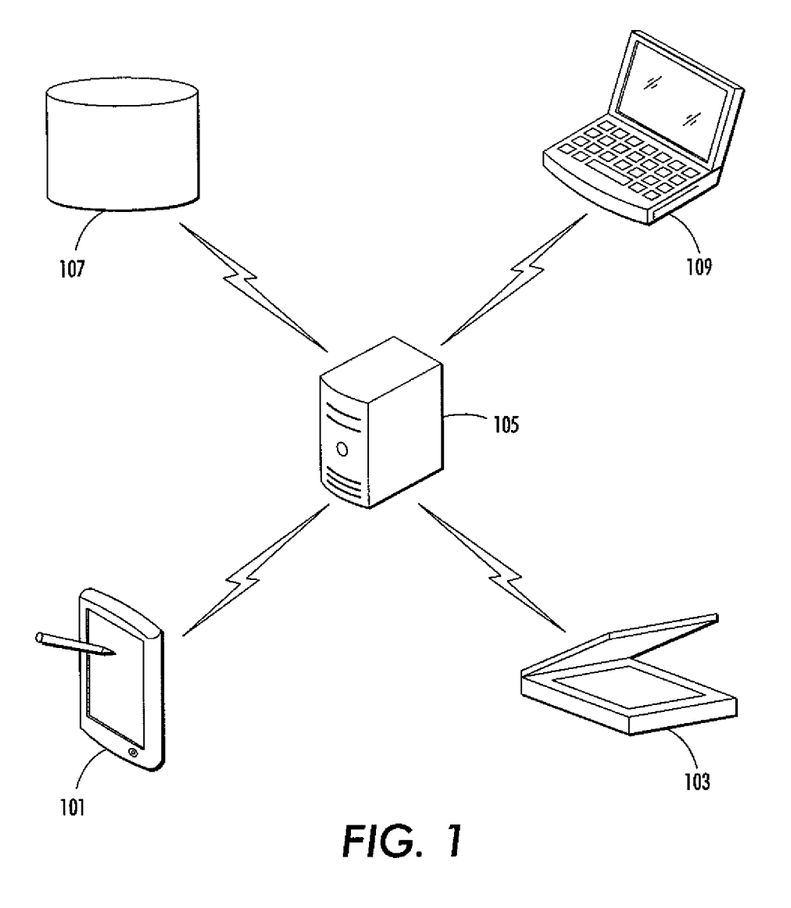
FIG. 1 illustrates various hardware items that may be used with a system for processing handwritten action items.

FIG. 1 illustrates various hardware items that may be used with a system for processing handwritten action items. The system will include one or more hardware elements that serve as an input device to receive handwritten notes, and which also process the notes to generate electronic files in which the notes are stored. One of example of such a hardware item is a computing device 101 having a touch-sensitive user interface, such as a tablet computer, a smartphone with touch screen, a laptop computer with a touch pad, and the like. Another example of such a hardware item is a document scanner 103 or other image capturing device such as a camera or a multifunction printing device having scanning capability.

The input device may include some or all elements of a capture module. A capture module is hardware and software that are collectively capable of receiving images of, or signals corresponding to, handwritten notes and converting the handwritten notes into an electronic data file. For example, when the input device is a scanner, camera or other image capturing device, the capture module may use optical character recognition (OCR) to identify the text, numbers and symbols in the notes and convert the notes into an electronic file. Any OCR method now or hereafter known to those of skill in the art may be used, such as such as that described in U.S. Pat. No. 6,396,951, the disclosure which is incorporated by reference in its entirety. Alternatively, when the input device includes a touch-sensitive screen or pad, the input may receive signals corresponding to strokes of a user's finger or stylus. Such a device will include a character recognition processor including processing hardware and programming instructions that instruct the hardware to receive the signals and generate an estimate of an alphanumeric character or symbol based on the relative positions, sizes and/or locations of each stroke. As yet another alternative, the input device may be a digital pen that uses an image sensor or motion sensor captures data corresponding to the user's strokes. An example of a digital pen is disclosed in U.S. Pat. No. 6,208,771, the disclosure of which is incorporated herein by reference in its entirety.

The system also includes one or more processors 105. The processor(s) may be included in the input device, or it/they may be remote from the input device but networked with the input device via one or more wireless and/or wired communications networks. The processor(s) may be in direct or indirect communication with one or more databases 107 that receive data from and provide data to the processor(s). Each database, which is a data structure comprising data stored on a computer-readable medium, may be included within or remote from the input devices. The processor(s) also may be in direct or indirect communication with one or more other networked electronic devices 109 such as a computer, printer, multifunction device, e-mail server, or other device.

In various embodiments, a user may train the system to recognize a specific user-defined shorthand for capturing handwritten action items. The user-defined shorthand will include one or more symbols. Each symbol may be a combination of letters and/or numbers; a non-alphanumeric illustration or shape such as a star, a check box, a simple picture, and the like; or any mark that the user wishes to associate with an action category. An action category is any category of action that the system may automatically perform using handwritten process parameters. An action category may include one or more sub-categories such as individual tasks. For example, an action category of "messaging" may include sub-categories or tasks such as "send e-mail message" or "send text message." Alternatively, a task such as "send e-mail message" may itself be designated as an action category, with one or more sub-categories based on parameters such as the email client that will be used.

The system may implement a training module that includes programming instructions that cause the system to issue one or more prompts and receive one or more inputs that enable the system to learn the user-defined symbols, associate each symbol with an action category, and store the symbols in the database in association with the action categories.

The training module may cause the system to learn the user-defined symbols in any number of ways. In a first option, the system may present a set of action categories to the user, along with a set of available symbols. The system may perform this presentation via a display, audio output, printed document or other presenting mechanism. The system may prompt the user to associate one of the available symbols with any of the presented action categories by entering a selection via a user interface such as a touch screen, keypad, microphone, or other input. For example, the system may prompt the user to choose a shorthand symbol for a "Send an E-mail" action category, and the user may use a keypad to choose the "@" symbol to correspond to that action category.

In a second option, the system may present set of action categories to the user, and it may prompt the user draw a user-defined symbol for each category. The system may receive the drawing via a touch screen or touch pad, via a scanner, or via another input mechanism. For example, when prompted with a "To Do" action category, the user may use a touch screen and stylus to draw a check box to correspond to that action category.

In a third option, the system may print a paper copy of a template containing a list of action items, along with data input fields in which the user can draw a symbol for each action item. For example, the document may include an entry for a "Schedule a Meeting" category, and the user may draw an encircled letter "X" in a field next to that entry. Optionally, the template may ask the user to draw the symbol more than once, so that the system can learn, and later recognize, variations in the user's symbol drawings. The system may then scan the paper and extract the user-defined symbols for storage in the database.

Additional options for learning user-defined symbols are possible. Each user-defined symbol and its action category will be stored in the database and later used as a trigger to perform one or more tasks based on handwritten action items that the system receives. The system that learns the symbols may use some or all of the hardware that receives and processes the handwritten action items, or the symbol learning and handwritten action processing systems may include different hardware.

Figure 2:
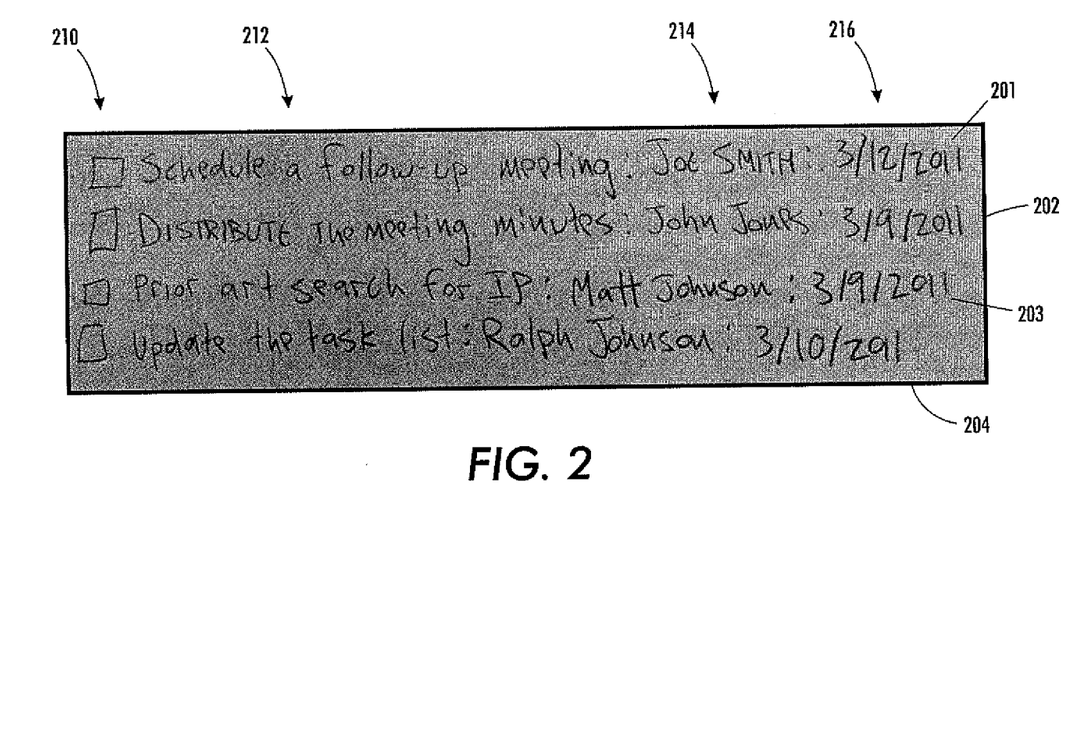
FIG. 2 illustrates an example of a handwritten action item list.

To help the system process handwritten action items, in some embodiments the system may establish a relatively constant format for action items within a category. For example, the system may establish a format for handwritten action items and instruct the user to use the format when writing the action items. Or, it may prompt the user to select a format for the handwritten action items. The format may include one or more data fields that are separated by one or more separation marks such as semicolons, colons, asterisks and the like. FIG. 2 illustrates an example of a set of handwritten action items 201-204 that include user-defined symbols, separation marks and data fields. In this set, the user has established a check-box 210 as a symbol to represent an action category of "to do." The colon is used as a separation mark for the data fields that follow the user-defined symbol. The data fields include an action description field 212, a responsible party field 214, and a due date field 216. Thus, in this example, the action category of "to do" may have a format that includes the user-defined symbol followed by, in sequence, an action description field, a responsible party field and a due date field.

The training module may include one or more prompts that allow a user to select the data fields for an action category from a set of available data fields, or to select the order of the data fields. For example, a "send email action" may have any number of candidate data fields, such as "send to," "send from," "subject," "due date," "priority," "include signature," "confidentiality" and the like. The user may reply to the training module's prompts to select the data fields and specify the order in which they will be presented. In some embodiments, some data fields may be identified as optional for a particular category, and others may be identified as mandatory for the category, so that the user will (or will not) be required to complete the data fields when creating new action items for that category.

In other embodiments, no format may be required for at least some of the handwritten action items. In such embodiments, the system may use natural language processing, text analytics (such as name recognition, date recognition, and the like) or any other now or hereafter known process to intelligently parse the various components of the handwritten action item.

Optionally, the system also gives the user an option to define custom data fields and/or action categories. For example, the system may allow the user to assemble a series of available action categories into a single action set. The user may then select a single user-defined symbol to correspond to the action set. An example of such an action set may include adding a meeting to a calendar, sending an email to other meeting attendees, and scheduling a prompt to send a reminder the day before the scheduled meeting.

Once a system has established a database of action categories, an information processing module may operate to receive handwritten action items, process the items to determine tasks to be performed, and use information contained in the handwritten action items to perform the task.

Figure 3:
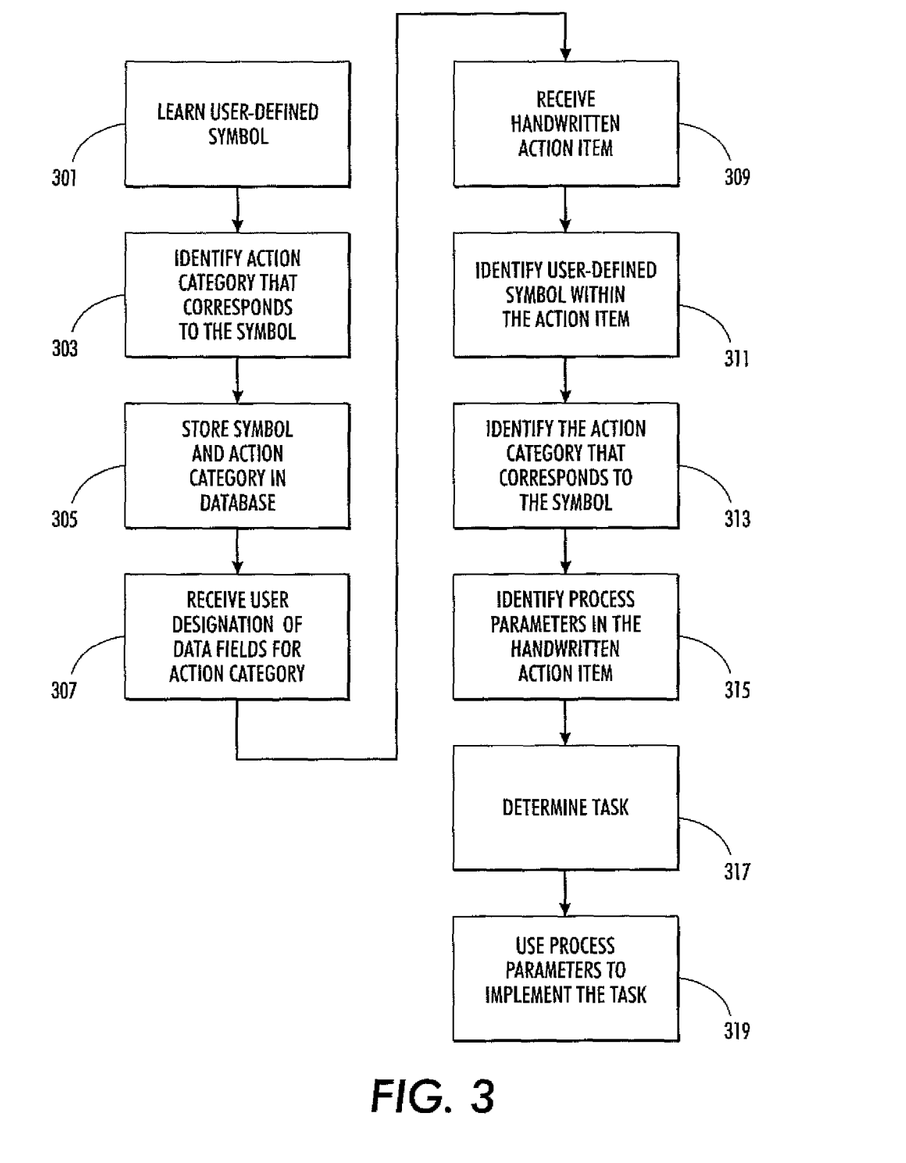
FIG. 3 is a flowchart that describes various steps that a handwritten action item recognition and implementation system may perform.

FIG. 3 is a flow diagram illustrating various steps that a system for processing and implementing handwritten action items may perform. For each symbol in a set of user-defined symbols, receiving the symbol via a document scanner, the system may learn 301 the symbol by receiving it via a scanner, touch screen or other user interface, an electronic file, or another input. The system will identify 303 an action category that corresponds to the symbol based on a user input. This may be done by displaying, broadcasting, or otherwise presenting a prompt that prompts the user to correlate a symbol to an action category, and receiving a user response to the prompt. Alternatively, the system may present the user with an action item that corresponds to a known category, receive a user-defined symbol in response to the presentation, and assign the known category to the received symbol. As yet another alternative, the system may receive a scanned or digital pen-created document containing multiple action items, each of which corresponds to a known unique category. The document also may include at least one handwritten symbol for each of the action items. Then, for at least one of the symbols in the document, the system may identify the known unique action category that corresponds to the symbol's action item in the document, and assign the known unique action category to that symbol. Other learning methods are possible.

Optionally, the system also may receive 307 a user designation of one or more data fields for the action category. The data fields may be designated for the input of process parameters, such as data to be used to implement an action, or data that identifies (or is useful to help the system) identify a task or subcategory for the action item.

Later, when the system receives 309 a handwritten action item, it may recognize 311 a user-defined symbol in the action item and access the stored data to identify 313 the action category that corresponds to the symbol. It may then identify one or more other portions of the handwritten action items as process parameters 315, such as by their position in the action item's data fields. The system will then use the action category (and optionally one or more of the process parameters) to identify a task to be performed 317. The system will then use the process parameters to implement the task 319.

As an example, in a handwritten action item that corresponds to a messaging category, the process parameters may include a data field that identifies a message recipient by name, email address, phone number, or another identifier. The task—which may be included in the message, automatically identified based on the action category, or inferred from one or more of the process parameters (such as a recipient identifier)—will include sending an e-mail, text message, fax or other electronic communication to the recipient. The system will then perform the task by causing an e-mail application, text message program, or another application to identify contact information for the recipient (such as by checking the identifying information against a list of known contacts), and then use that contact information to create and send an electronic message to the recipient.

As another example, in a handwritten action item that corresponds to a calendar category, the process parameters may include a data field that identifies a date and/or time for an appointment. The process parameters also may include information such as length of time, location, or other details. The task may include updating an electronic calendar application, and the system will perform the task by causing an electronic calendar application to add the appointment with the included process parameters. For example, if the process parameters include a date, time (e.g., start time, end time, and/or duration), and a name or other identifier for at least one invitee, then the system may recognize the action item as an appointment. It may then cause a calendar application to generate an appointment, access a contact list to identify contact information (such as an e-mail address or mobile phone number) for the invitee, and cause a messaging application to use the contact information to send the appointment request to the invitee.

As another example, in a handwritten action item that corresponds to a call category, the process parameters may include a data field that identifies a party to be called, such as by name or phone number. The task may include causing a mobile phone application to dial the party to be called. Optionally, if the data field identifies the party by name, the task also may include accessing a data structure that stores a set of contacts and contact numbers, finding a phone number that corresponds to, the name of the party to be called, and place the call to the found phone number.

The system may use any suitable text recognition process to recognize process parameters and tasks in handwritten action items. For example, the database may include a taxonomy of process parameters and the system will look for words that match those in the taxonomy, and/or it may use semantic reasoning to determine which words of the taxonomy are most appropriate based on the words in the handwritten item. Other methods may be used. In some embodiments, the system may use a display or audio output to present the user with one or more candidate tasks and candidate process parameters, where the candidates are those that the system has determined are likely to be present in the handwritten action item. If so, the user may be given the opportunity to confirm or reject the candidate, or to select one or more tasks and/or process parameters from multiple candidates.

Figure 4:
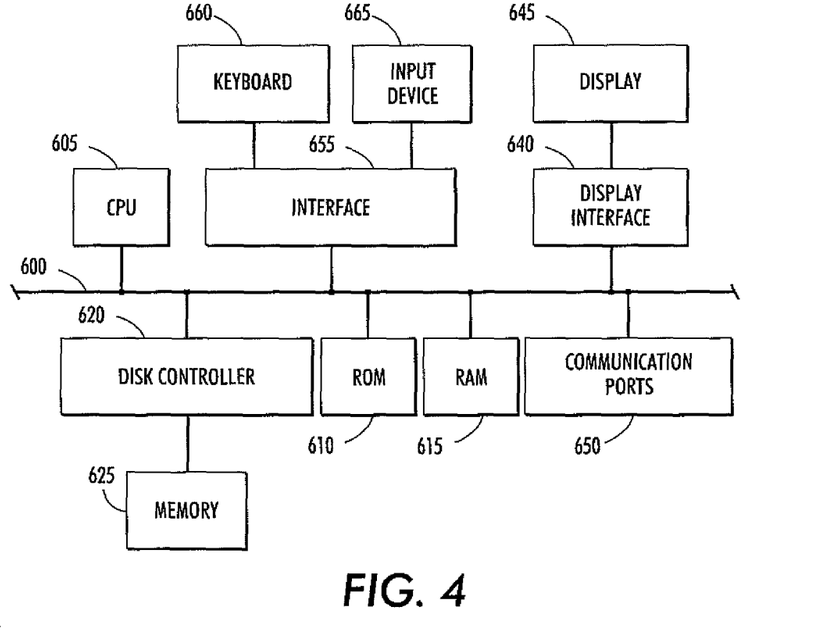
FIG. 4 is a block diagram showing various hardware components that may be used with the disclosed systems.

FIG. 4 is a block diagram of internal hardware that may be used to contain or implement program instructions for any of the modules and/or related devices as described above. A bus 600 serves as the main information highway interconnecting the other illustrated components of the hardware. CPU 605 is the central processing unit of the system, performing calculations and logic operations required to execute a program.

CPU 605, alone or in conjunction with one or more of the other elements disclosed in FIG. 4 is a processing device, computing device or processor as such terms are used within this disclosure. Read only memory (ROM) 610 and random access memory (RAM) 615 constitute examples of memory devices or processor-readable storage media.

A controller 620 interfaces with one or more optional tangible, computer-readable memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. Communication with external devices, such as a printing device, may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for processing action items, the system comprising:
   a database that stores a plurality of user-defined symbols and a corresponding action category for each of the user-defined symbols;
   a capture module comprising programming instructions that, when executed, cause an electronic device to capture handwritten information;
   an information processing module comprising one or more programming instructions that, when executed, cause a processor to:
   process the captured information to identify a handwritten action item in the captured information;
   identify a first portion of the handwritten action item that includes one of the user-defined symbols;
   assign a category to the handwritten action item based on the action category that corresponds to the user-defined symbol that is in the identified portion;
   identify a plurality of data fields containing process parameters in a second portion of the handwritten action item;
   determine a task to be performed based on the first portion, the second portion, or both; and
   perform the task using the process parameters;
   a training module comprising one or more programming instructions that, when executed, cause the processor to, before the electronic device captures handwritten information:
   present to a user a set of candidate data fields,
   receive, via a user interface, a data field format that includes a subset of the set of candidate data fields, and
   store the data field format in the database in association with the user-defined symbol's corresponding action category.

2. The system of claim 1, wherein the training module further comprises one or more programming instructions that, when executed, cause the processor to:
   learn one or more user-defined symbols;
   identify an action category that corresponds to each of the learned user-defined symbols; and
   store each learned user-defined symbol in association with its corresponding action category in the database.

3. The system of claim 2, wherein the instructions that, when executed, cause the processor to learn the one or more user-defined symbols comprise instructions to:
   present a user with a prompt to correlate a symbol to an action category; and
   receive a user response to the prompt.

4. The system of claim 2, wherein the instructions that, when executed, cause the processor to learn the one or more user-defined symbols comprise instructions to:
   present a user with an action item that corresponds to a known category;
   receive a user-defined symbol in response to the presenting; and
   assign the known category to the received user-defined symbol.

5. The system of claim 2, wherein the instructions that, when executed, cause the processor to learn the one or more user-defined symbols comprise instructions to:
   analyze a handwritten document comprising a plurality of action items, wherein each action item corresponds to a known unique action category, and the document further comprises at least one handwritten symbol for each of the action items; and
   for at least one of the handwritten symbols in the document, identify the known unique action category which corresponds to that handwritten symbol's action item, and assign the identified known unique action category to that handwritten symbol.

6. The system of claim 1, wherein:
   one or more of the process parameters comprise a message recipient;
   the task comprises sending an electronic message; and
   the instructions that, when executed, cause the processor to perform the task comprise instructions to cause a messaging application to:
   identify contact information for the message recipient, and
   create and send an electronic message to the message recipient.

7. The system of claim 1, wherein:
   one or more of the process parameters comprise a date;
   the task comprises updating an electronic calendar application; and
   the instructions that, when executed, cause the processor to perform the task comprise instructions to cause a calendar application to create and save an appointment on the date.

8. The system of claim 1, wherein:
one or more of the process parameters comprise a date, a time and an invitee;
the task comprises updating an electronic calendar application; and
the instructions that, when executed, cause the processor to perform the task comprise instructions to:
cause the calendar application to create and save an appointment on the date at the time,
cause the calendar application to generate an appointment request for the invitee,
access a messaging application to retrieve contact information for the invitee, and
cause the messaging application to use the contact information to transmit the appointment request to the invitee.

9. A method of identifying and acting on a handwritten action item, comprising:
learning a user-defined symbol by:
analyzing a handwritten document comprising a plurality of action items, wherein each action item corresponds to a known unique action category, and the document further comprises at least one handwritten symbol for each of the action items, and
for at least one of the handwritten symbols in the document, identifying the known unique action category which corresponds to that handwritten symbol's action item, and assigning the identified known unique action category to that handwritten symbol;
capturing, via an electronic user interface, a handwritten action item, wherein the handwritten action item comprises a symbol and a plurality of data fields containing process parameters;
electronically analyzing the handwritten action item to identify the symbol;
accessing a database of symbols and action categories to determine an action category that corresponds to the symbol;
electronically analyzing the handwritten action item to identify the process parameters;
determine a task to be performed based on at least the action category; and
by a processor, applying the process parameters to automatically perform the task.

10. The method of claim 9, wherein learning the user-defined symbol further comprises:
presenting a set of candidate action categories to a user;
receiving, via the electronic user interface, the user-defined symbol;
receiving, via the user interface, a selection from the set of candidate action categories;
assigning the selection as the symbol's corresponding action category; and
storing the user-defined symbol in association with its corresponding action category in the database.

11. The method of claim 9, further comprising, before the capturing wherein learning the user-defined symbol further comprises:
presenting the user with a set of candidate data fields;
receiving, via the user interface, a data field format that includes a subset of the set of candidate data fields; and
storing the data field format in the database in association with the symbol's corresponding action category.

12. The method of claim 9, wherein:
one or more of the process parameters comprise a message recipient;
the task comprises sending an electronic message; and
performing the task comprises causing a messaging application to:
identify contact information for the message recipient, and
create and send an electronic message to the message recipient.

13. The method of claim 9, wherein:
one or more of the process parameters comprise a date;
the task comprises updating an electronic calendar application; and
performing the task comprises causing a calendar application to create and save an appointment on the date.

14. The method of claim 9, wherein:
one or more of the process parameters comprise a date, a time and an invitee;
the task comprises updating an electronic calendar application; and
performing the task comprises:
causing the calendar application to create and save an appointment on the date at the time,
causing the calendar application to generate an appointment request for the invitee,
accessing a messaging application to retrieve contact information for the invitee, and
causing the messaging application to use the contact information to transmit the appointment request to the invitee.

15. The method of claim 9, wherein:
one or more of the process parameters comprise identifying information for a party to be called; and
the task comprises causing a mobile phone application to place a call to the party to be called.

16. A method of identifying and acting on a handwritten action item, comprising:
by an electronic device having a processor, a user interface, and an interface to a database:
outputting, via the user interface, a set of candidate data fields;
receiving, via the user interface, a data field format that includes a subset of the set of candidate data fields;
storing the data field format in the database in association with an action category corresponding to a symbol;
capturing, via the user interface, a handwritten action item, wherein the handwritten action item comprises the symbol and a plurality of data fields containing process parameters;
electronically analyzing the handwritten action item to identify the symbol;
accessing the database to determine an action category that corresponds to the symbol;
electronically analyzing the handwritten action item to identify the process parameters;
determining a task to be performed based on at least the action category; and
applying the process parameters to automatically perform the task.

17. The method of claim 16, further comprising, before the capturing, learning a user-defined symbol by:
presenting a set of candidate action categories to a user;
receiving, via the user interface, the user-defined symbol;
receiving, via the user interface, a selection from the set of candidate action categories;
assigning the selection as the symbol's corresponding action category; and
storing the user-defined symbol in association with its corresponding action category in the database.

18. The method of claim 16, further comprising, before the capturing, learning a user-defined symbol by:
- analyzing a handwritten document comprising a plurality of action items, wherein each action item corresponds to a known unique action category, and the document further comprises at least one handwritten symbol for each of the action items; and
- for at least one of the handwritten symbols in the document, identifying the known unique action category which corresponds to that handwritten symbol's action item, and assigning the identified known unique action category to that handwritten symbol.

19. The method of claim 16, wherein:
one or more of the process parameters comprise a date, time and an invitee;
the task comprises updating an electronic calendar application; and
performing the task comprises:
- causing the calendar application to create and save an appointment on the date at the time,
- causing the calendar application to generate an appointment request for the invitee,
- accessing a messaging application to retrieve contact information for the invitee, and
- causing the messaging application to use the contact information to transmit the appointment request to the invitee.

* * * * *